United States Patent
Lee et al.

(10) Patent No.: US 8,769,418 B2
(45) Date of Patent: Jul. 1, 2014

(54) ENHANCED MESSAGE HANDLING

(75) Inventors: Mason Lee, Berkeley, CA (US); Loren Brichter, Philadelphia, PA (US)

(73) Assignee: Borange, Inc., Berkeley, CA (US)

( * ) Notice: Subject to any disclaimer, the term of this patent is extended or adjusted under 35 U.S.C. 154(b) by 113 days.

(21) Appl. No.: 13/095,851

(22) Filed: Apr. 27, 2011

(65) Prior Publication Data
US 2012/0278732 A1    Nov. 1, 2012

(51) Int. Cl.
*G06F 3/01*    (2006.01)
*H04M 1/725*    (2006.01)
*H04L 12/58*    (2006.01)

(52) U.S. Cl.
CPC ..... *H04M 1/72552* (2013.01); *H04L 29/08584* (2013.01); *H04L 12/5815* (2013.01)
USPC ............ 715/752; 715/759; 715/751; 715/753

(58) Field of Classification Search
USPC .................................. 715/752, 751, 759, 753
See application file for complete search history.

(56) References Cited

U.S. PATENT DOCUMENTS

| | | | | |
|---|---|---|---|---|
| 5,873,023 | A * | 2/1999 | Phillips et al. | 340/7.28 |
| 2004/0015548 | A1 * | 1/2004 | Lee | 709/204 |
| 2004/0017396 | A1 * | 1/2004 | Werndorfer et al. | 345/751 |
| 2006/0271630 | A1 * | 11/2006 | Bensky et al. | 709/206 |
| 2008/0028027 | A1 * | 1/2008 | Jachner | 709/206 |
| 2008/0153459 | A1 * | 6/2008 | Kansal et al. | 455/412.1 |
| 2009/0153909 | A1 * | 6/2009 | Smith | 358/402 |
| 2010/0246571 | A1 * | 9/2010 | Geppert et al. | 370/352 |

OTHER PUBLICATIONS

"Textie Web Site." https://textie.me. Published Apr. 28, 2010. Accessed May 4, 2011.
"Textie—Apple App Store May 4, 2011." http://itunes.apple.com/app/textie-messaging/id353912946?mt=8. Accessed May 4, 2011.
"Textie—Apple App Store Jul. 21, 2011." http://itunes.apple.com/app/textie-messaging/id353912946?mt=8. Accessed Jul. 21, 2011.

* cited by examiner

*Primary Examiner* — Weilun Lo
*Assistant Examiner* — Peiyong Weng
(74) *Attorney, Agent, or Firm* — Banner & Witcoff, Ltd.

(57) ABSTRACT

Methods, computer readable media, and apparatuses for enhanced message handling are presented. A first message may be sent to a first identity. Thereafter, a second message may be sent to a second identity. Alternatively, a first message may be received from a first identity, and a second message may be received from a second identity. In either case, in response to determining, based on local address book data, that the first identity and the second identity are both associated with a first person, the first message and the second message may be displayed in a single conversation window. Subsequently sent and/or received messages may be similarly aggregated into the conversation window based on such messages being to and/or from one or more identities of the same person. Additionally, these subsequently aggregated messages may be sent and/or received via different communication services, such as email, SMS, and/or social networking services.

23 Claims, 15 Drawing Sheets

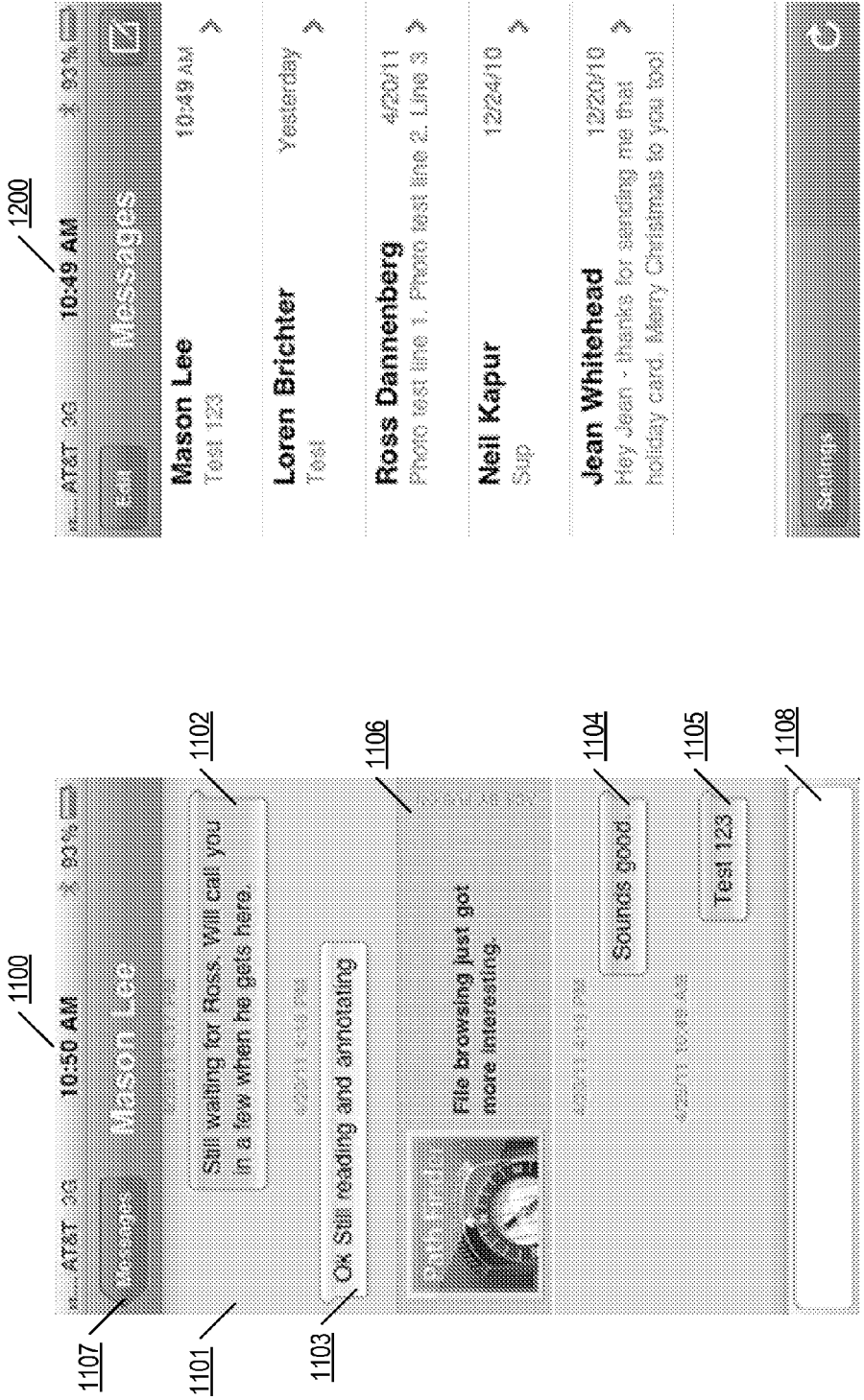

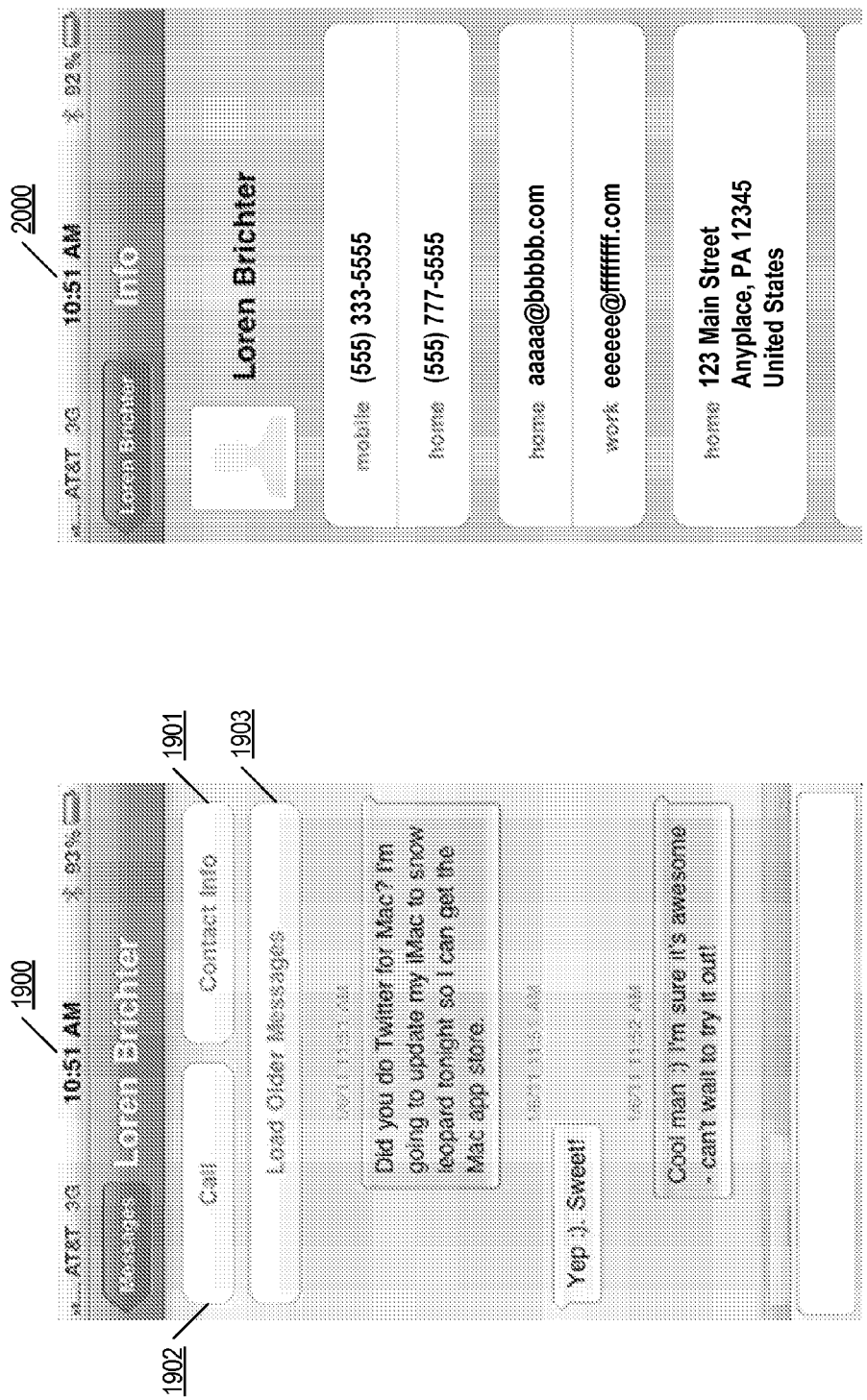

ENHANCED MESSAGE HANDLING

TECHNICAL FIELD

Aspects of this disclosure may generally relate to computer processing technologies, communication technologies, mobile device technologies, and/or computer software technologies. In particular, aspects of this disclosure may relate to technologies that provide enhanced message handling, such as methods, systems, computer-readable media, and/or apparatuses that provide more convenient, functional, and/or user-friendly ways of electronically exchanging chat messages between different people and/or computing devices.

BACKGROUND

Increasingly, people are using computing devices to communicate with other people. A wide range of computing devices are being used for electronic communication, such as desktop computers, laptop computers, mobile devices (e.g., smartphones, tablet computers, etc.), and so on. Additionally, a growing variety of communication services are available for people to use, such as electronic mail or "email," Short Message Service messaging or "SMS," messaging provided by social networking services like FACEBOOK and TWITTER, and more. As the popularity of electronic communication continues to expand, however, it may become more difficult for people to manage and maintain conversations with other people across a variety of disparate communication services and/or channels and to keep track of the increasingly many handles that people establish for themselves on the different services.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to enhanced message handling, and particularly relate to providing more convenient, functional, and easy-to-use ways for people to communicate electronically. According to one or more aspects, a first message may be sent to a first identity. The first message may be sent by a computing device, such as a smart phone or tablet computer, and the first identity may represent a user identifier or handle that is associated with a particular communication service (e.g., an email address associated with an email communication service, a mobile phone number associated with a Short Message Service (SMS) communication service, a username associated with a social networking service, such as FACEBOOK or TWITTER, etc.). As used herein, an "identity" may include both a handle and a denotation of the particular communication service on which the handle is used by a user to communicate. Subsequently, a second message may be sent to a second identity. Like the first identity, the second identity also may represent a user identifier or handle that is associated with a particular communication service. Thereafter, in response to determining, based on local address book data, that the first identity and the second identity are both associated with the same person (e.g., because both the first identity and the second identity are used by the same person in communicating via different communication services), the first message and the second message may be displayed in a single conversation window. For example, the computing device may display the two messages as being part of the same conversation in a user interface where various messages are displayed.

According to one or more additional aspects, an identity may be registered for use with a first communication service, and the identity may be used by a first person when communicating via a second communication service different from the first communication service. For example, a person may register (for use with a new communication service) an identity that they use with another communication service, such as an email address that they use with an email communication service or a mobile phone number that they use with a Short Message Service (SMS) communication service. In this example, the new communication service (that the user registers with) may be a proprietary communication service provided by a software application, and by registering their email address or mobile phone number, the person may be able to communicate via the proprietary communication service using a handle by which other people (like the person's friends and colleagues) may already know the person. As explained in greater detail below, the proprietary communication service may provide enhanced communication abilities to the person beyond those provided by the other communication service (e.g., the proprietary communication service may allow the person to electronically send "push" messages to other people for free, whereas other communication services, such as email and SMS, may charge the person to send such messages, and e.g., the proprietary communication service may allow the person to send data not supported by the other communication service, such as long messages and/or photo attachments), and by registering, the person may be able to take advantage of these enhanced communication abilities.

After the identity has been registered, for instance, a first message may be received from a first identity, and the first message may be addressed to the registered identity. For example, the first message may be an email message that is received from a particular email address and addressed to the person associated with the identity that was registered in the example above. Subsequently, a second message may be received from a second identity, and the second message also may be addressed to the person associated with the registered identity. For example, the second message may be an SMS message that is received from a particular mobile phone number and addressed to the identity that was registered in the example above. Thereafter, in response to determining, based on local address book data, that the first identity and the second identity are both associated with a second person (e.g., a person different from the person who registered the identity in the example above), the first message and the second message may be displayed in a single conversation window. For example, the computing device may display the two messages as being part of the same conversation in a user interface where various messages are displayed, even though, for instance, the first message may have been sent as an email message and the second message may have been sent as an SMS message (e.g., because the first message may have been signed with an email identity and the second message may have been signed with a mobile telephone number).

BRIEF DESCRIPTION OF THE DRAWINGS

The present disclosure is illustrated by way of example and not limited in the accompanying figures in which like reference numerals indicate similar elements and in which:

FIGS. 7-22 illustrate example user interfaces that may be displayed by a computing device according to one or more illustrative aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
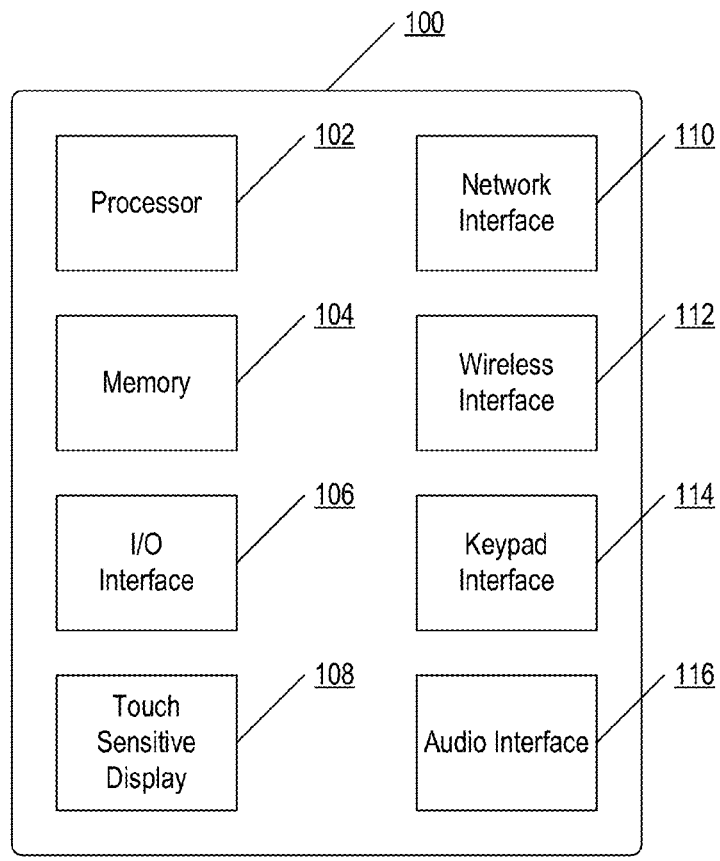
FIG. 1 illustrates an example computing device according to one or more illustrative aspects of the disclosure.

FIG. 1 illustrates an example computing device according to one or more illustrative aspects of the disclosure. Computing device 100 may include one or more hardware and/or software components, such as processor 102, memory 104, input/output interface 106, touch sensitive display 108, network interface 110, wireless interface 112, keypad interface 114, and audio interface 116. By including one or more of these and/or other components, computing device 100 may be used as a desktop computer, laptop computer, server, tablet computer, netbook, cellular phone, mobile computing device, and/or the like. In at least one arrangement, computing device 100 may include a plurality of each of the components described herein. For instance, in at least one arrangement, computing device 100 may include two or more processors.

In one or more arrangements, processor 102 may execute computer-executable and/or computer-readable instructions stored in memory 104. For instance, processor 102 may execute instructions that cause one or more of the methods described herein to be performed by computing device 100. Additionally or alternatively, processor 102 may execute instructions that cause one or more user interfaces described herein to be displayed on a display included in computing device 100, such as touch sensitive display 108.

In one or more arrangements, touch sensitive display 108 may comprise an electronic visual display (e.g., a liquid crystal display ("LCD") screen, a plasma display panel ("PDP"), a cathode ray tube ("CRT") display, a light emitting diode ("LED") display, and/or an organic light emitting diode ("OLED") display). Touch sensitive display 108 may respond to touch-based user input and thus may function as a "touch screen" display. Touch sensitive display 108 may implement one or more touch sensing technologies (e.g., resistive, surface acoustic wave, capacitive, strain gauge, optical imaging, dispersive signal technology, acoustic pulse recognition, coded LCD, etc.).

In one or more arrangements, input/output interface 106 may include one or more adapters, connection ports, and other components via which computing device 100 may provide input and output. For instance, input/output interface 106 may include one or more adapters for outputting data to and/or receiving data from a display (e.g., for providing audiovisual, graphical, and/or textual output), keypad, microphone, mouse, optical reader, scanner, speaker (e.g., for providing audio output), stylus, touch screen, and/or other component. Input/output interface 106 further may include a USB port, serial port, parallel port, IEEE 1394/Firewire port, APPLE iPod Dock port, and/or other ports.

In one or more arrangements, network interface 110 may establish and/or provide network connectivity to a network (e.g., a local area network, a wide area network, such as the Internet, etc.). Network interface 110 thus may include hardware and/or software components for communicating via Ethernet, TCP/IP, FTP, HTTP, HTTPS, and/or other protocols. Similarly, wireless interface 112 may establish and/or provide network connectivity to a wireless network (e.g., a local area network, a wide area network, such as the Internet, a cellular voice and/or data network, etc.). Wireless interface 112 thus may include hardware and/or software components for communicating via Ethernet, TCP/IP, FTP, HTTP, HTTPS, IEEE 802.11b/g/a/n, Bluetooth, CDMA, TDMA, GSM and/or other protocols.

In one or more arrangements, keypad interface 114 may include one or more physical keys, buttons, and/or switches that may be operated to provide input to and/or control various aspects of computing device 100. Audio interface 116 may include one or more speakers, audio ports (e.g., a headphone jack), microphones, and/or other audio components. Audio interface 116 may allow computing device 100 to provide audio feedback, receive audio input (e.g., sound input, speech commands, etc.), and/or provide telephone functionalities.

In at least one arrangement, computing device 100 may comprise a commercially-available, touch-sensitive mobile computing device, such as an APPLE iPhone, an APPLE iPad, a GOOGLE Nexus One, a MOTOROLA Droid, a PALM Pre, and/or the like. In at least one additional arrangement, computing device 100 may comprise a commercially-available computing device, such as an APPLE iMac all-in-one computer, an APPLE MacBook laptop, a LENOVO ThinkPad laptop, an ACER Aspire One netbook, a DELL OptiPlex desktop, an HP Pavilion tablet, and/or the like.

Figure 2:
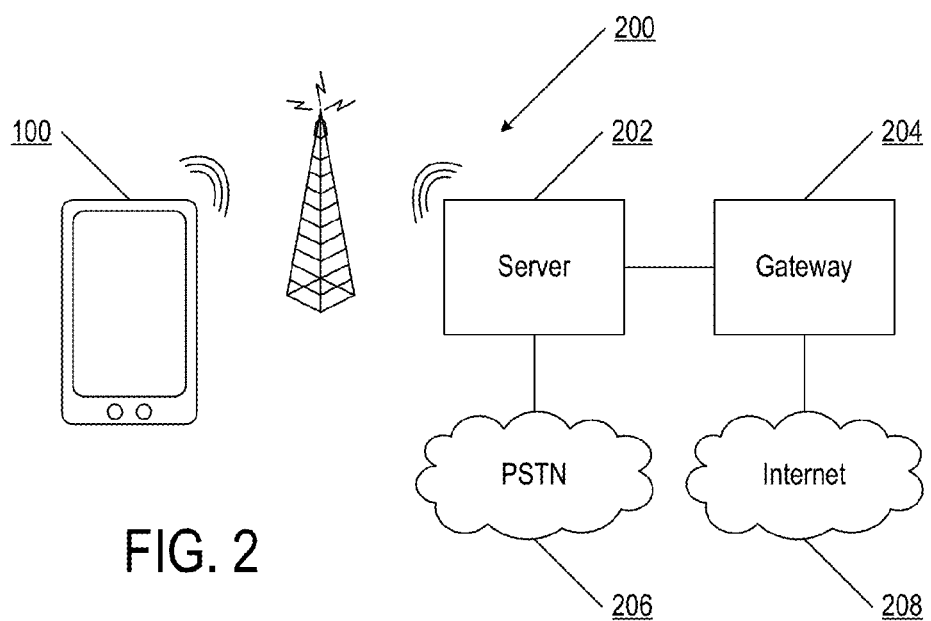
FIG. 2 illustrates an example operating environment according to one or more illustrative aspects of the disclosure.

FIG. 2 illustrates an example operating environment according to one or more illustrative aspects of the disclosure. Operating environment 200 may include a server 202, a gateway 204, a public switched telephone network ("PSTN") 206, and/or other networks, such as the Internet 208, a cellular network, a satellite network, and/or the like. Computing device 100 may operate within operating environment 200 using one or more of the hardware and/or software components described above. In addition, server 202 and/or other devices in operating environment 200 may include one or more processors, memories, and/or other hardware and/or software components similar to those described above with respect to FIG. 1.

In one or more arrangements, computing device 100 may communicate with server 202 via a wireless and/or wired network. For instance, server 202 may connect to and/or communicate with computing device 100 via a wireless cellular network. In addition, server 202 may connect computing device 100 to PSTN 206, and this connection may enable computing device 100 to make and/or receive telephone calls. Server 202 also may connect computing device 100 to gateway 204, and this connection may enable computing device 100 to access a wide area network, such as the Internet 208. Accordingly, computing device 100 may include wireless voice and data functionalities, and computing device 100 may provide functionalities similar to and/or be used as a smartphone, tablet, netbook, and/or other mobile computing device.

Figure 3A:
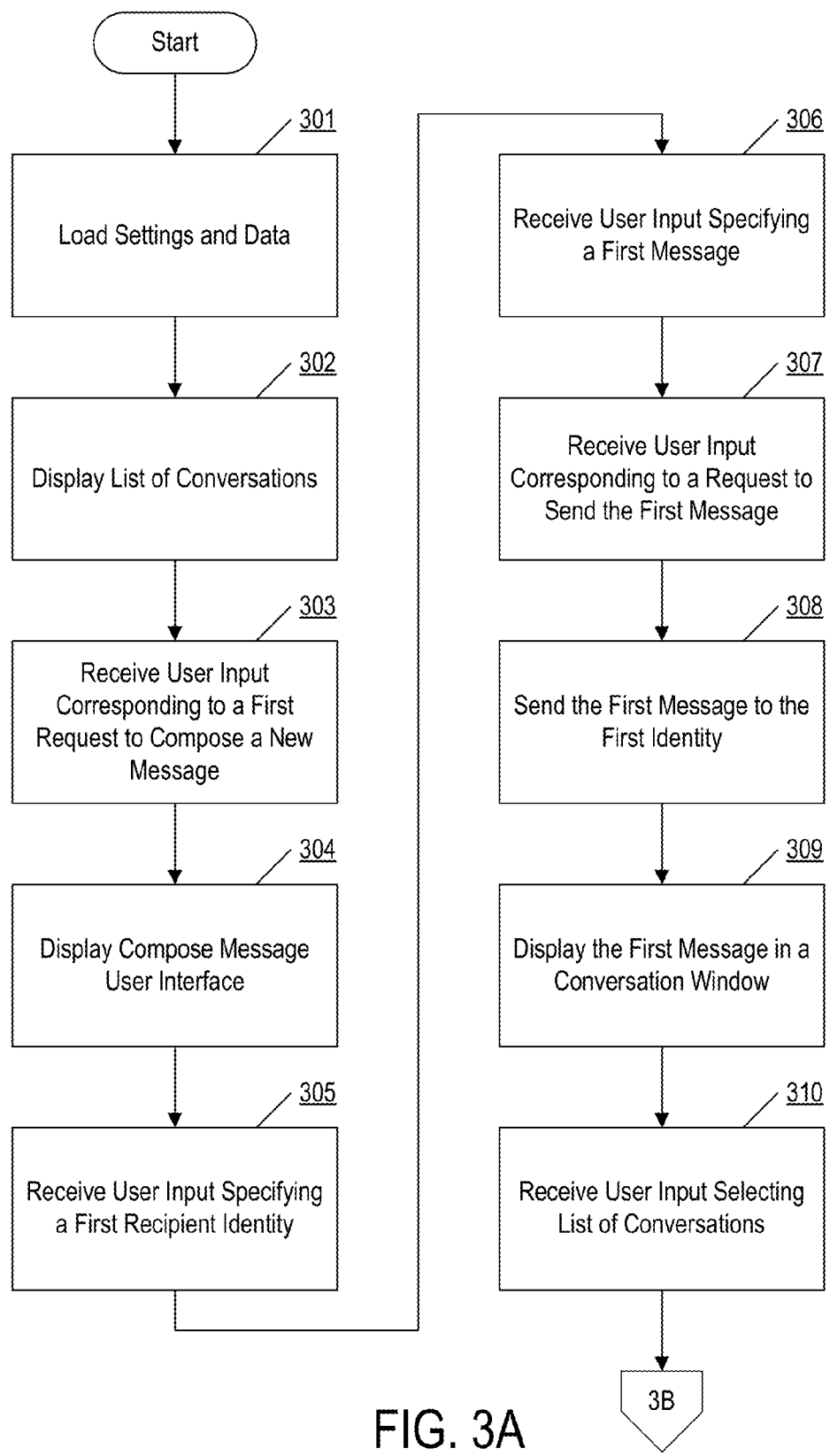
FIGS. 3A and 3B illustrate an example method of handling messages according to one or more illustrative aspects of the disclosure.
Figure 3B:
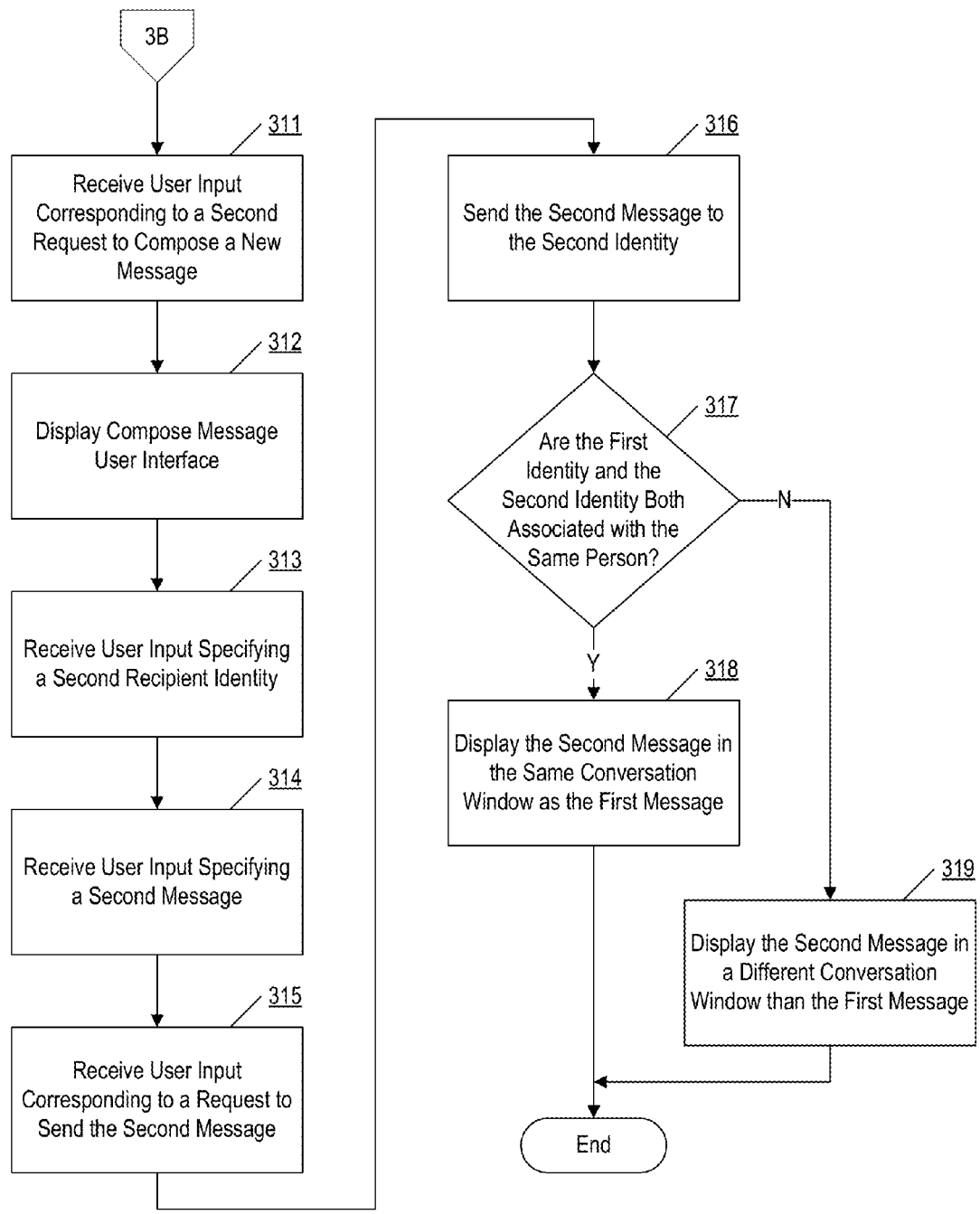

FIGS. 3A and 3B illustrate an example method of handling messages according to one or more illustrative aspects of the disclosure. According to one or more aspects, the methods described herein, such as the method illustrated in FIGS. 3A and 3B, may be implemented in and/or performed by and/or in conjunction with a computing device, such as computing device 100. For example, any and/or all of the methods described herein may be embodied in one or more non-transitory computer-readable media storing computer-executable instructions that, when executed (e.g., by a computing device, computer processor, etc.), cause at least one computing device to perform such methods. Additionally or alternatively, any and/or all of the methods described herein may be embodied in an apparatus that includes at least one processor and memory storing computer-readable instructions that, when executed by the at least one processor, cause the apparatus to perform such methods.

In step 301, settings and data may be loaded. For example, in step 301, a user's computing device, such as computing device 100, may load settings and data associated with a communications software application. The settings may include, for instance, account settings (e.g., one or more names, phone numbers, email addresses, social networking usernames, etc. that may be used by the user when communicating with the application), display settings (e.g., settings that control the size of text in various user interfaces displayed by the application; settings that control the color of different aspects of the various user interfaces displayed by the application, such as the color of chat bubbles, for instance; settings that control whether advertisements are displayed; etc.), notification settings (e.g., settings that control whether a preview notification is displayed when a new push message is received, settings that control whether the message sender's verified address is displayed with such preview notifications if such preview notifications are to be displayed, etc.), sound settings (e.g., settings that control whether the application should make sounds when messages are sent, received, etc.), social networking settings (e.g., settings that control how local address book data is used, for instance, to find other people included in local address book data who may also use the application; settings that control interactions with social networking services, for instance, to broadcast information about the application on FACEBOOK and/or TWITTER; settings that control interactions with other services, for instance, to rate the application with an associated application download service, such as the APPLE APP STORE; etc.), and/or any other desirable settings that may relate to various aspects of the application. In one or more arrangements, the data loaded may be associated with the communications software application and may include previous conversations and/or messages with other people (e.g., messages previously sent to and/or received by the user, the software application, and/or the computing device), additional content associated with such conversations and/or messages (e.g., pictures, videos, sounds, etc. that may be embedded in such conversations and/or messages), advertisements (e.g., advertising text, images, videos, sounds, and/or other content that may be displayed when executing the software application), and/or any other desirable data that may relate to various aspects of the application.

In step 302, a list of conversations may be displayed. For example, in step 302, the computing device may display a user interface that includes a list of conversations, which may include previous conversations and/or messages facilitated by the computing device and/or by the particular software application being executed by the computing device. An example of such a user interface is illustrated in FIG. 7.

Figures 7, 8:
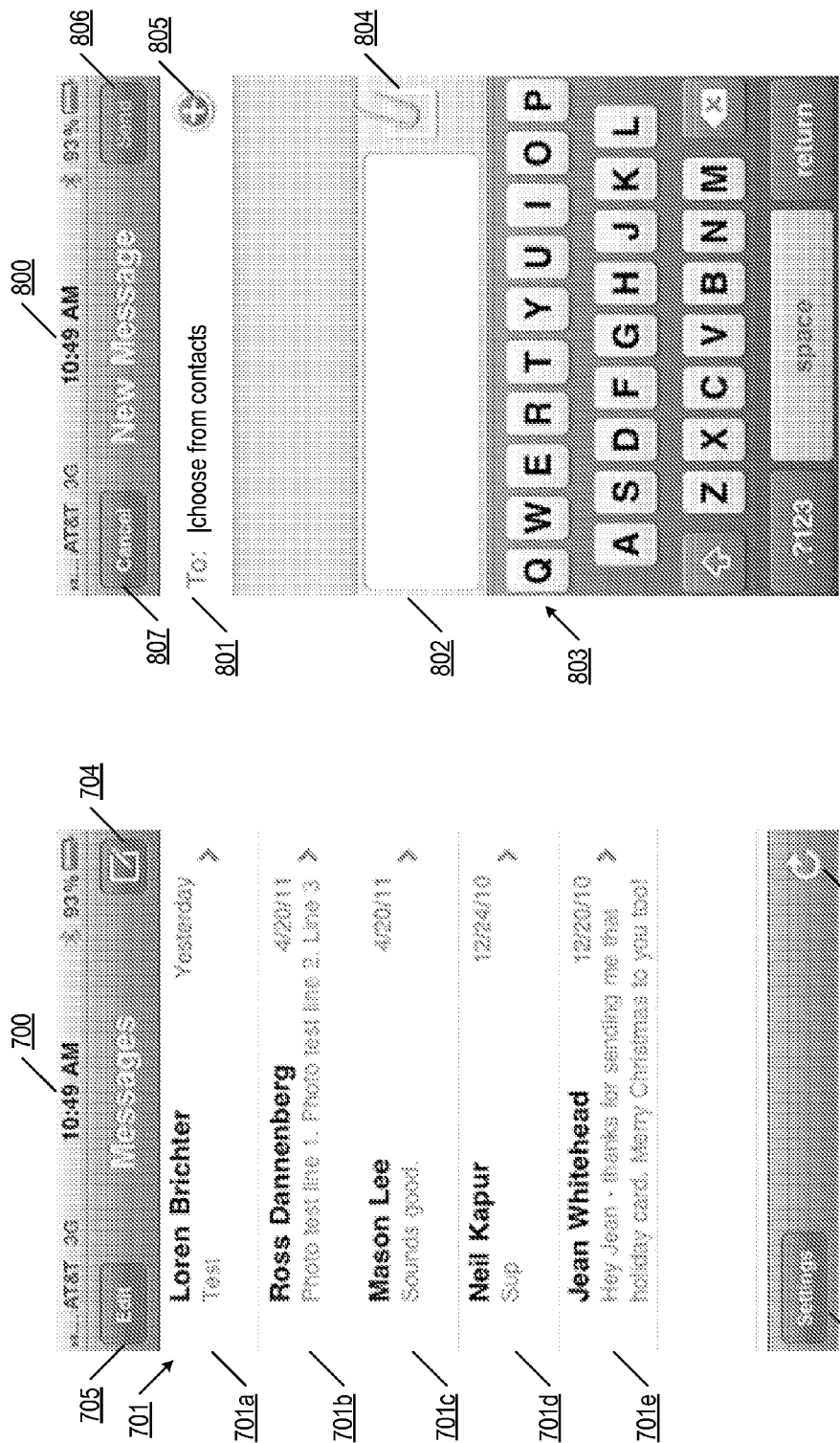

As seen in FIG. 7, an example user interface 700 may include a conversation list 701. Conversation list 701 may include one or more conversations, such as conversations 701*a*, 701*b*, 701*c*, 701*d*, and 701*e*. In at least one arrangement, where the particular software application has not been used before and/or where there are no existing conversations (e.g., because the user has deleted such conversations), conversation list 701 might not include any conversations.

In one or more arrangements, user interface 700 further may include a settings button 702 (which may, for instance, allow a user to set and/or modify various settings, such as those described above with respect to step 301), a refresh button 703 (which may allow a user to refresh the conversation list 701, for instance, by contacting a message server to determine if any new messages have been sent to the user of the software application and/or computing device), a compose message button 704 (which may, for instance, allow a user to compose and/or send a new message), and an edit button 705 (which may, for instance, allow a user to delete one or more conversations from the conversation list 701 and/or reorder the one or more conversations included in the conversation list 701).

Referring again to FIG. 3A, in step 303, user input corresponding to a first request to compose a new message may be received. For example, in step 303, the computing device may receive user input, via a user interface, indicating that the user would like to compose and/or send a new message. In one or more arrangements, such user input may be a selection of compose message button 704 in user interface 700.

In step 304, a compose message user interface may be displayed. For example, in step 304, the computing device may display a user interface that allows a user to compose and/or send a new message, and such a user interface may include various fields and/or controls via which a user can specify one or more recipients of the message, the content of the message itself (e.g., text, pictures, sounds, videos, etc. to be included in the message), and/or other information. An example of such a user interface is illustrated in FIG. 8.

As seen in FIG. 8, an example user interface 800 may include a recipient selection field 801 (which may, for instance, allow a user to input and/or select one or more identities to which the new message should be addressed for sending), a message text field 802 (which may, for instance, allow a user to input text to be sent as the new message), a virtual keyboard 803 (which may, for instance, allow the user to type via the user interface so as to cause characters to appear in the message text field 802), and an attachment button 804 (which may, for instance, allow a user to select one or more pictures, videos, sounds, and/or other files to attach to the new message). Additionally or alternatively, user interface 800 may include a contact selection button 805 (which may, for instance, allow a user to view local address book data and/or select, as message recipients, one or more contacts from such local address book data). User interface 800 further may include a send button 806 (which, upon selection, may cause the computing device and/or the software application being executed to send the new message to the selected recipients) and/or a cancel button 807 (which, upon selection, may cancel the previous request to compose and/or send the new message, e.g., by returning the user to the conversation list 701 and/or user interface 700 without sending a new message).

Figure 9:
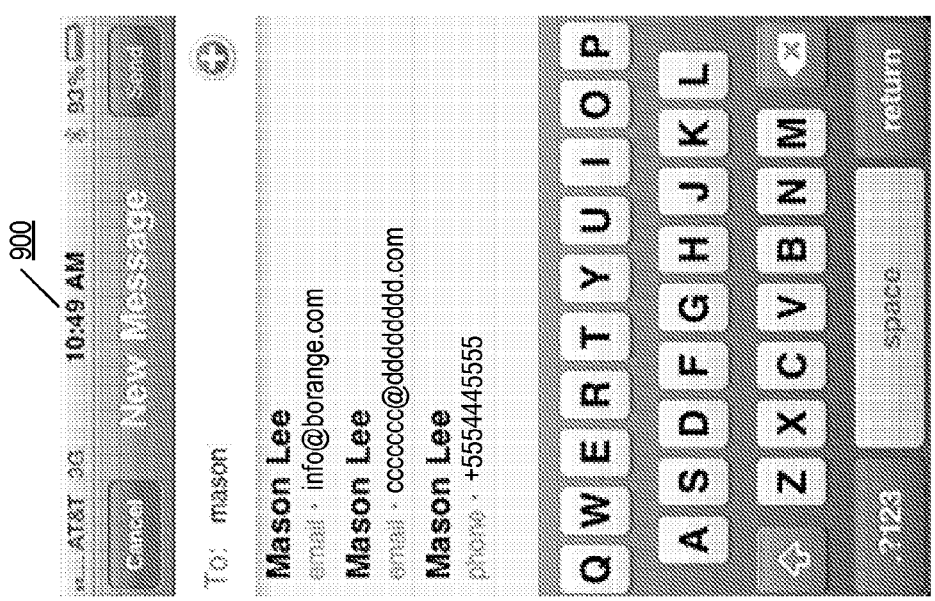

Referring again to FIG. 3A, in step 305, user input specifying a first recipient identity may be received. For example, in step 305, the computing device may receive user input, via a user interface, indicating that a particular identity is to receive the new message. In one or more arrangements, such user input may be received via recipient selection field 801 of user interface 800. In some arrangements, the recipient identity may be selected by the user from local address book data, for instance, by using contact selection button 805 of user interface 800. The recipient identity received as user input may be an identifier or username associated with a particular communication service. For example, the identity may include a mobile telephone number associated with an SMS communication service, an email address associated with an email communication service (e.g., Simple Mail Transfer Protocol or SMTP), a username associated with a social networking service (e.g., a TWITTER or FACEBOOK username), and/or the like. An example of a user interface screen 900 that may be displayed (e.g., by the computing device and/or by the software application) as a user provides user input specifying a first recipient identity is illustrated in FIG. 9.

Figure 10:
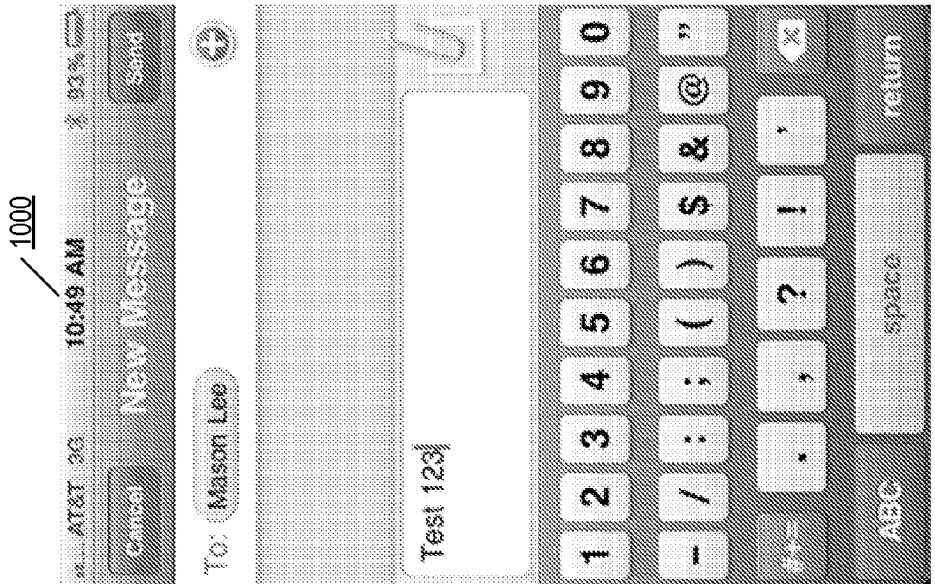

In step 306, user input specifying a first message may be received. For example, in step 306, the computing device may receive user input, via a user interface, indicating that particular text and/or other content should make up the new message. In one or more arrangements, this user input may be received via message text field 802 of user interface 800. Additionally or alternatively, additional content, such as one or more pictures, videos, sounds, and/or other files, may be attached to the new message as a result of user input received via attachment button 804. An example of a user interface screen 1000 that may be displayed (e.g., by the computing device and/or by the software application) as a user provides user input specifying a first message is illustrated in FIG. 10.

In step 307, user input corresponding to a request to send the first message may be received. For example, in step 307, the computing device may receive user input, via a user interface, corresponding to a request to send the newly composed message. In one or more arrangements, this user input may be received as a selection of send button 806 of user interface 800.

In step 308, the first message may be sent to the first identity. For example, in sending the first message, the computing device (e.g., computing device 100) may perform (or cause to be performed by another computing device, such as a message server) one or more steps of the example method of sending a message illustrated in FIG. 4, which is further described below.

In step 309, the first message may be displayed in a conversation window. For example, in step 309, the computing device may display a user interface that includes a conversation window, which in turn includes the first message. An example of such a user interface is illustrated in FIG. 11.

As seen in FIG. 11, user interface 1100 may include a conversation window 1101. Conversation window 1101 may include one or more messages, such as messages 1102, 1103, 1104, and 1105. In one or more arrangements, conversation window 1101 also may include one or more advertisements, such as advertisement 1106. User interface 1100 also may include a messages button 1107 (which may, for instance, allow the user to view a list of other conversations facilitated by the computing device and/or the software application). For example, a user may select messages button 1107 to cause the computing device and/or the software application to display user interface 700 and/or conversation list 701 of FIG. 7. Additionally, user interface 1100 may include a compose message field 1108, which may function similar to compose message button 704 and/or message text field 802 to facilitate composition of a new message.

In some instances, when a user begins entering text into compose message field 1108 to reply to a message in the conversation window, for instance, the computing device may need to select a recipient identity associated with the other person in the conversation to which the reply message should be sent. In particular, the conversation window may include messages from multiple identities associated with a single person, and the computing device may need to select one of those identities to be the recipient of the reply message. Thus, in one or more arrangements, the computing device may select, as the recipient identity, the identity of the other person to which previous messages were most recently sent to and/or received from. In one or more alternative arrangements, the computing device may select, as the recipient identity, the identity of the other person to which previous messages were most recently sent (while disregarding the identity of the other person from which previous messages were most recently received). In still more alternative arrangements, the computing device may prompt the user to select an identity of the other person as the recipient identity or may allow for a preferred identity to be set for use when sending messages from the existing conversation.

Figure 21:

In some additional instances, messages may include non-textual content, such as pictures, sounds, videos, and/or the like. In these instances, non-textual content may be displayed with the messages in a conversation window. An example of a user interface screen 2100 that includes a conversation window with messages that include non-textual content is illustrated in FIG. 21.

Referring again to FIG. 3A, in step 310, user input selecting a list of conversations may be received. For example, in step 310, the computing device may receive user input, via a user interface, corresponding to a request to view the listing of conversations. In one or more arrangements, this user input may be received as a selection of messages button 1107 of user interface 1100. In response to this user input, the computing device and/or the software application being executed may, for instance, display a user interface that includes the listing of conversations. An example of a user interface screen 1200 that may be displayed (e.g., by the computing device and/or by the software application) in response to this user input is illustrated in FIG. 12.

In step 311, user input corresponding to a second request to compose a new message may be received. For example, in step 311, the computing device may receive user input, via a user interface, indicating that the user would like to compose and/or send a new message, similar to how such user input was received in step 303, as described above.

In step 312, a compose message user interface may be displayed. For example, in step 304, the computing device may display a user interface that allows a user to compose and/or send a new message, similar to how such a user interface was displayed in step 304, as described above.

In step 313, user input specifying a second recipient identity may be received. For example, in step 313, the computing device may receive user input, via a user interface, indicating that a particular identity is to receive the new message, similar to how such user input was received in step 305, as described above. In some arrangements, the second recipient identity may be the same as the first recipient identity (e.g., the received user input may specify that a particular email address is to receive the second message, and the first message was previously sent to the same particular email address). In one or more arrangements, however, the second recipient identity may be different from the first recipient identity. For example, the first recipient identity may be a first email address and the second recipient identity may be a second email address different from the first email address. In another example, the first recipient identity may be an email address and the second recipient identity may be a mobile telephone number used for sending and/or receiving SMS messages. In yet another example, the first recipient identity may be a username associated with a social networking service (e.g., a FACEBOOK or TWITTER username) and the second recipient identity may be an email address. Other combinations may be possible. As discussed in greater detail below, while the second recipient identity may be different from the first recipient identity, the second recipient identity might still be associated with the same person as the first recipient identity. For example, the second recipient identity and the first recipient identity may be different in that the second recipient identity is a particular mobile telephone number used for sending and/or receiving SMS messages while the first recipient identity is a particular email address used for sending and/or receiving email messages, but in this example, it may be the case that the particular mobile telephone number and the particular email address are both used by the same person, such that both the first recipient identity and the second recipient identity are both associated with the same person.

In step 314, user input specifying a second message may be received. For example, in step 314, the computing device may receive user input, via a user interface, indicating that particular text and/or other content should make up the second message, similar to how such user input was received in step 306, as described above.

In step 315, user input corresponding to a request to send the second message may be received. For example, in step 315, the computing device may receive user input, via a user interface, corresponding to a request to send the newly composed second message, similar to how such user input was received in step 307, as described above.

In step 316, the second message may be sent to the second identity. For example, in step 316, the computing device may send the second message, similar to how the computing device sent the first message in step 308, as described above.

Figure 22:
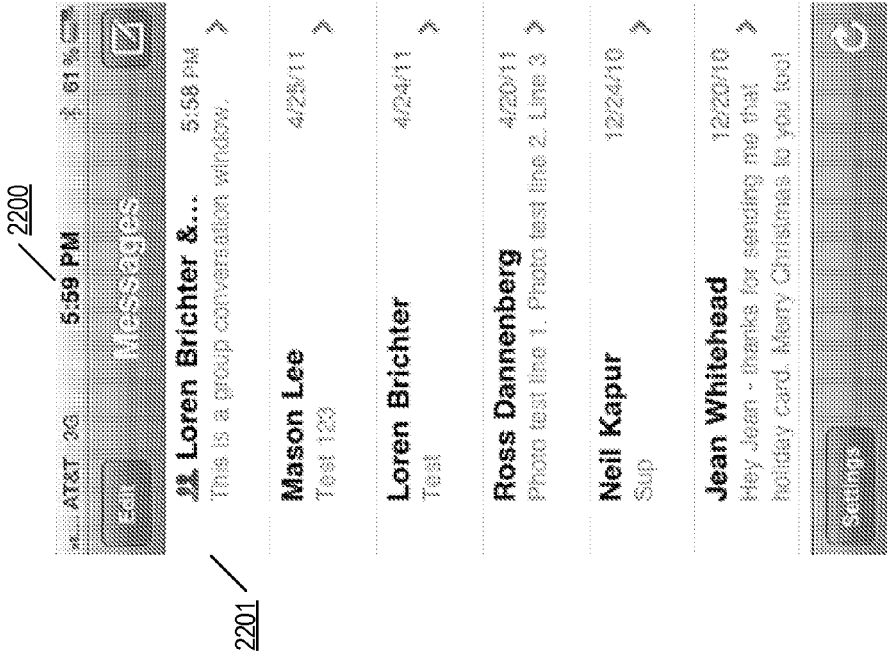

In one or more alternative arrangements, if the computing device and/or software application determines that the second message includes the same content as the first message, has the same composition time as the first message, was composed in the same action, and/or requested to be sent via the same user command, then the computing device may display a group chat user interface via which a conversation may be carried on with both the first identity and the second identity. An example of a user interface screen that includes a conversation listing 2200 with a group chat conversation 2201 is illustrated in FIG. 22.

In step 317, it may be determined whether the first identity and the second identity are both associated with the same person. For example, in step 317, the computing device may determine whether the first identity and the second identity are both used by the same person in communicating via one or more communication services. In one or more arrangements, determining whether the first identity and the second identity are both associated with the same person may be based on local address book data. In such arrangements, the computing device may, for example, search local address book data to determine whether entries exist for the first identity and the second identity in the local address book data. Subsequently, if entries do exist in the local address book data for the first identity and the second identity, the computing device may determine whether the first identity and the second identity are both associated with the same contact (e.g., the same person or entity) in the local address book data. According to one or more aspects, local address book data may include contact information locally stored on the computing device (e.g., computing device 100), such as contact information stored in an electronic address book application and/or data table. Additionally or alternatively, local address book data may include contact information that is created by, edited by, maintained by, and/or otherwise accessible to the user (e.g., the user of the computing device and/or the software application) even where such information is stored remotely from the computing device, such as in a remote contact management application, a data synchronization folder, a computing cloud, and/or another remote data management and/or storage service or facility.

In one or more additional and/or alternative arrangements, determining whether the first identity and the second identity are both associated with the same person may be based on information registered with the communication service. In such arrangements, the computing device may, for example, send requests to the communication service to obtain more information about the first identity and the second identity, and in response to receiving such requests, the communication service may send (and the computing device may receive) user information corresponding to the first identity and the second identity. Subsequently, the computing device may analyze this user information to determine whether the first identity and the second identity are both registered as belonging to the same user. In still more additional and/or alternative arrangements, the communication service may send (and/or the computing device may receive) this identity correlation information when sending (and/or receiving) one or more messages (e.g., identity correlation information may be embedded in and/or otherwise received by the computing device along with one or more messages). Additionally or alternatively, the computing device may provide a user interface for selecting a preferred identity to be used when sending messages to a specific person.

If it is determined, in step 317, that the first identity and the second identity are both associated with the same person, then in step 318, the second message may be displayed in the same conversation window as the first message. For example, if the computing device determines that the first identity and the second identity are both associated with the same person, then the computing device may display the second message in the same conversation window as the first message, similar to how the computing device displayed the first message in a conversation window in step 309, as described above. Thus, the computing device may display, for instance, the second message as a new message in conversation window 1101 of user interface 1100.

On the other hand, if it is determined, in step 317, that the first identity and the second identity are not both associated with the same person, then in step 319, the second message may be displayed in a different conversation window than the first message. For example, if the computing device determines that the first identity and the second identity are not both associated with the same person, then the computing device may display the second message in a different conversation window than the first message, such as a new conversation window or an existing conversation window in which other messages to and/or from the second identity are displayed. While the user interface and the conversation window thus displayed may resemble conversation window 1101 and user interface 1100, respectively, the conversation window in this example would not be the same conversation window in which the first message was displayed (e.g., because in this instance, the first message and the second message have presumably been sent to different people).

Figure 4:
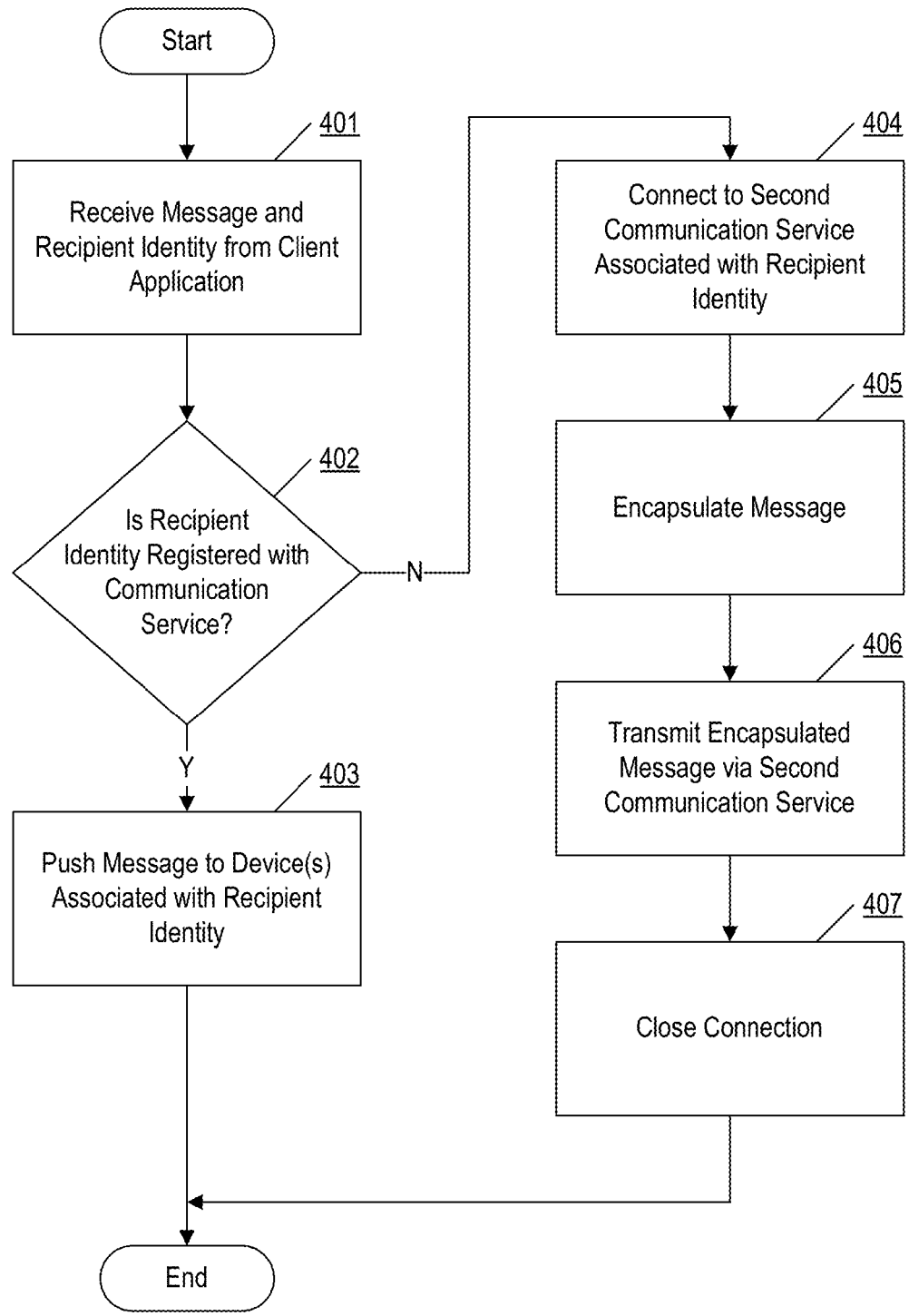
FIG. 4 illustrates an example method of sending a message according to one or more illustrative aspects of the disclosure.

FIG. 4 illustrates an example method of sending a message according to one or more illustrative aspects of the disclosure. According to one or more aspects, the example method of FIG. 4 may be performed by a computing device that functions as a message server, such as server 202 and/or another server able to communicate with computing device 101 via the Internet 208, operating alone and/or in combination with computing device 101.

In step 401, a message and a recipient identity may be received from a client application. For example, in step 401, a message server may receive from a client computing device (e.g., computing device 100) and/or a software application executed thereon a message and a recipient identity to which the message is to be delivered. The message and recipient identity may, for instance, correspond to the message composed and requested to be sent to the recipient identity selected in the example method described above (e.g., in steps 304-308).

In step 402, it may be determined whether the recipient identity is registered with the communication service. For example, in step 402, the message server may determine whether the recipient identity has been registered (e.g., as further described below with respect to FIG. 5) with the communication service provided by the message server. According to one or more aspects, the message server may make this determination by querying user registration information stored in one or more databases and/or data tables on the message server.

If it is determined, in step 402, that the recipient identity is registered with the communication service, then in step 403, the message may be pushed to the one or more devices associated with the recipient identity. For example, if the message server determines that the recipient identity is registered with the communication service, then the message server may transmit the message to the one or more devices that have been registered as message endpoints of the recipient identity. Additionally or alternatively, the message server may create a notification that a new message has been sent to the registered entity and place the notification in a queue that is periodically checked by the one or more user devices, such that when the one or more user devices check the queue and receive the notification, the one or more devices will then download the new message from the message server and/or notify the user of the new message. Subsequently, the method may end.

On the other hand, if it is determined, in step 402, that the recipient identity is not registered with the communication service, then in step 404, a second communication service associated with the recipient identity may be connected to. For example, if the recipient identity is an email address that is not registered with the communication service, then the message server may connect to an email communication server (e.g., an SMTP server, a Post Office Protocol or "POP" server, an Internet Message Access Protocol or "IMAP" server, etc.). As another example, if the recipient identity is a mobile telephone number that is not registered with the communication service, then the message server may connect to a text messaging server (e.g., an SMS server, a Multimedia Messaging Service or "MMS" server, etc.). As still another example, if the recipient identity is a social networking username that is not registered with the communication service, then the message may connect to a social networking server (e.g., a FACEBOOK server, a TWITTER server, etc.). As further described below, opening such a connection may allow the message server to act as a bridge to another communication service by sending the message via the other communication service.

In step 405, the message may be encapsulated. For example, in step 405, the message server may encapsulate the message by formatting for compatibility with the second messaging service (e.g., by adding appropriate header information, sender information etc.). For instance, if the second messaging service is an email communication service, then the message server may generate appropriate email headers (e.g., as preferred and/or required by email protocols, such as SMTP and/or SMTP extensions) to identify the sender of the message (e.g., the user of the computing device) and/or to facilitate messages to be sent in reply to the message. The message server may facilitate replies, for example, by sending the message on behalf of the user from a purpose-built email address in an SMTP "From" and/or "Reply-To" header, such that any messages sent in reply to the unique email address will be routed back via email to the first communication service and the message's sender (e.g., instead of being sent to the user via the second communication service, which in this example, would be an email communication service).

In one or more arrangements, the purpose-built email address may be a coded email address that is generated (e.g., by the message server) according to internal identifiers associated with the sending user and/or his or her one or more registered identities. For example, a different code may be generated by the message server for each user and every identity to which the user sends one or more messages. The code may be placed in the local part of the email address, and the domain part may be a domain name under the control of the message server. The message server may store the generated codes (e.g., in a data table stored in memory), and when reply email messages are received by the message server's email gateway, the message server may look up the particular code associated with a particular reply message (e.g., in the data table) to determine which user the particular reply message should be sent to (and/or to determine to which identity the original message was sent). Subsequently, the message server may create a new message (e.g., a new message that includes the particular reply message) to be sent to the user (e.g., the user that the message server determined should receive the particular reply) that is "from" the identity to which the user sent the original message. The message server thereafter may send (and the user computing device may receive) this message. By implementing such a scheme (e.g., by using reply-to addresses in these ways), a communication service may allow for reply routing to be determined entirely based on parsing the SMTP "To:" header of an emailed reply. This may be beneficial, for instance, because the communication service may thus allow replies to be sent from any email accounts to which the original message was forwarded (instead of only allowing replies to be sent from the email account corresponding to the exact identity to which the message was originally sent). For instance, in a situation where the coded reply-to email were forward from a person's first email address to the person's second email address, the person could still reply to the coded reply-to email from their second email address and their reply would be sent back to sender of the original message, as described above.

According to one or more aspects, the code generated by the message server may include a human-readable portion that is based on the sender's name (e.g., the human-readable portion may include the sender's name, but may be adjusted to be email compliant, such as by replacing spaces with underscores, etc.) and which may be ignored by a computing device, and a machine-readable portion which may be comprised of a random string of characters and/or numbers. In at least one arrangement, the length of the random string may be selected so as to protect, from spam messages, a reply gateway provided by the message server (e.g., the length of the random string may be selected such that the length is greater than some minimum amount). In at least one additional arrangement, the message server may allow a user to cancel one or more codes, for instance, if the code becomes compromised and/or if the user begins receiving unwanted messages, such as spam messages, via a particular code.

In some instances, if, in step 405, the second messaging service is an SMS communication service, then the message server may generate appropriate SMS headers and/or divide the message into one or more messages so as to comply with the character limit imposed on such SMS messages. Additionally or alternatively, if the second messaging service is an SMS communication service, then the message server may use one or more SMTP gateways to send the message, in which case steps and/or methods similar to those described above with respect to email communications may be performed. Similar compatibility functions may be performed for other types of communication services, as preferred and/or mandated by such communication services.

In step 406, the encapsulated message may be transmitted via the second communication service. For example, in step 406, the message server may send the encapsulated message created in step 405 via the second communication service (e.g., in accordance with one or more protocols implemented by the second communication service). For instance, if the second communication service is an email service, the message server may send the encapsulated message in accordance with one or more email protocols (such as SMTP), if the second communication service is a mobile telephone text messaging service, the message server may send the encapsulated message in accordance with one or more mobile telephone text messaging protocols (such as SMS, MMS, etc.), and so on.

In some arrangements, if a message cannot be bridged (e.g., communicated from a first communication service to a second communication service different from the first communication service) in a bi-directional manner (e.g., if the first communication service cannot encapsulate a message for transmission via the second communication service in a way in which the recipient of the message could respond to the message so as to cause a reply message to be transmitted to the original sender via the first communication service), the message server could send one-way messages that do not allow for the recipient to reply to the sender by simply replying to the message. In these arrangements, the message could be sent with a prompt that may, for instance, ask the user to use the first message service to continue the conversation, or may request and/or route the user to a web page in which a user interface for replying via the first message service could be presented.

In step 407, the connection may be closed. For example, in step 407, the message server may disconnect from the second communication service. Subsequently, the method may end.

Figure 5:
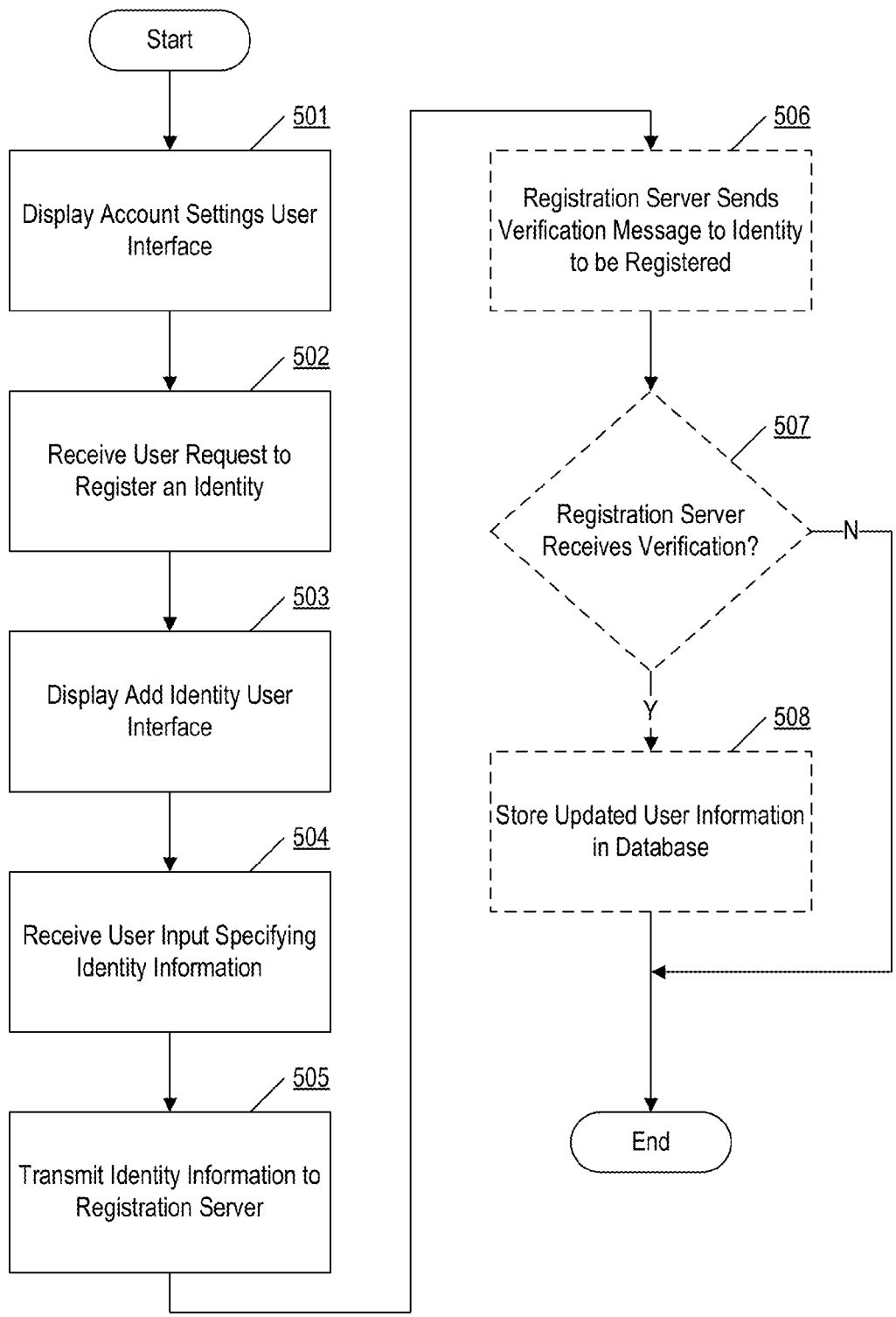
FIG. 5 illustrates an example method of registering an identity with a communication service according to one or more illustrative aspects of the disclosure.

FIG. 5 illustrates an example method of registering an identity with a communication service according to one or more illustrative aspects of the disclosure. As further described elsewhere herein, registering an identity with the communication service may allow the identity to be used in sending and/or receiving messages (e.g., push messages) via the communication service, may enable a user to send messages as being from one or more registered identities, and/or may enable recipients of messages to update local address book data based on identity information registered with the communication service, among other things.

Additionally or alternatively, by registering multiple identities, a user may be able to be "found" by a person who might know just one of many online identities that the user uses to communicate. A person may have a work email address and a home email address, for instance, and may wish to accept messages addressed in the messaging system to either address. Furthermore, by registering multiple identities, a user may be able to send messages that are more secure and/or considered to be authentic. For example, being able to send messages a user who has registered, and thus proven to control, multiple communication endpoints or social networking accounts imbues such messages with additional authenticity with respect to the sender of such messages. With the proliferation of social networking services and electronic messaging systems, providing for multi-factor identification (e.g., by identity registration, as described herein) may create increased trust among others that an account is owned and/or used by whom it appears to be owned and/or used by. In some arrangements, a communication service and/or messaging system may rate the authenticity of sent messages based on the number and types of identities registered to the send of that message. Further still, by registering multiple identities, a user may be able to later specify that copies of all and/or select messages should always or conditionally be sent to endpoints (e.g., computing devices, email accounts, etc.) represented by those identities.

Figures 13, 14:
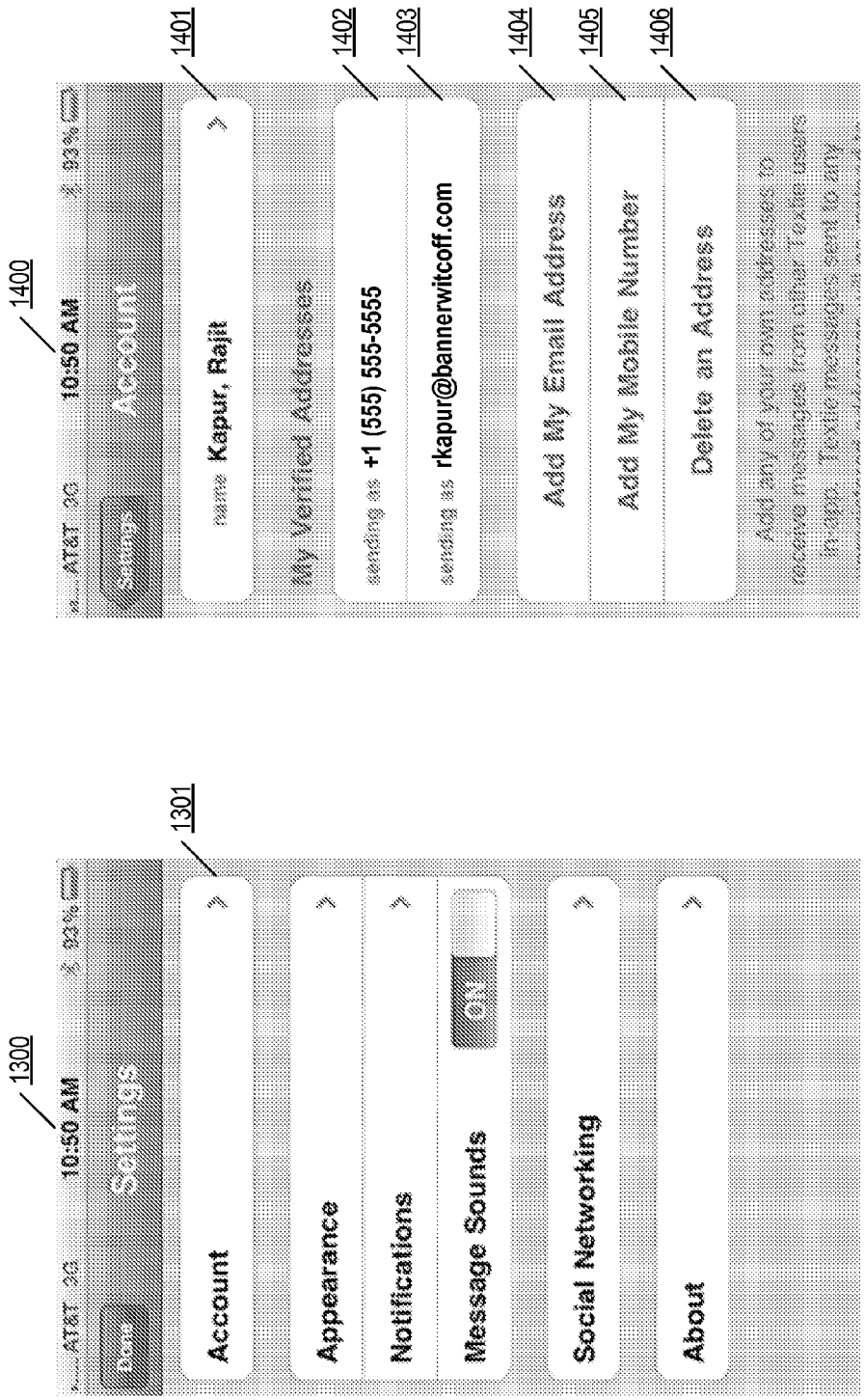

In step 501, an account settings user interface may be displayed. For example, in step 501, a user computing device (e.g., computing device 100) may display a user interface via which a user may set and/or modify one or more preferences. An example user interface screen 1300 that may be displayed (e.g., by the user computing device and/or by the software application executed by the user computing device) when a user requests to view and/or modify settings is illustrated in FIG. 13. Additionally or alternatively, where a user requests to view and/or modify account settings, for instance, by selecting account option 1301 in user interface 1300, then another user interface may be displayed via which a user may set and/or modify one or more preferences specifically related to their user account. An example of such a user interface is illustrated in FIG. 14.

As seen in FIG. 14, user interface 1400 may include a plurality of controls 1401-1406 that may allow a user to set and/or modify various settings related to the communication service. For example, user interface 1400 may include a name control 1401, which may allow a user to set and/or modify how their name appears to recipients of messages sent by the user.

In one or more arrangements, user interface 1400 also may include one or more verified address controls 1402 and 1403 which may allow a user to select and/or modify which identities their messages appear to be sent from when viewed by recipients of such messages. In this context, to say that a message is "sent from" a given identity might not mean that the message is delivered via the protocol and/or communication service normally associated with the given identity, but rather may mean that the user of the communication service sending that particular message has verified, with the messaging service, that he or she controls the endpoint normally associated with the given identity. For instance, upon selecting verified address control 1402, the user may be able to selectively enable (and/or disable) messages sent by the application from being "sent as" from the identity listed in verified address control 1402. Verified address control 1403 may operate in a similar way with respect to the identity listed in verified address control 1403. In one or more arrangements, verified address controls 1402 and 1403 may function like on/off switches, such that if a user were to select verified address control 1402, the "sending as" text would disappear and the user computing device and/or software application would be disabled from sending messages as from the identity listed in verified address control 1402. If the user were to again select verified address control 1402, for instance, the "sending as" text would reappear and the user computing device and/or software application would again be enabled to send messages as from the identity listed in verified address control 1402. In an example where two or more verified address controls are enabled (e.g., as illustrated in FIG. 14), the user computing device and/or the software application would send new messages as originating from the user associated with the two or more identities. This may enhance security and reassure recipients of authenticity of the message, as the message would be "sent as" being from multiple identities associated with a particular user.

Figure 17:
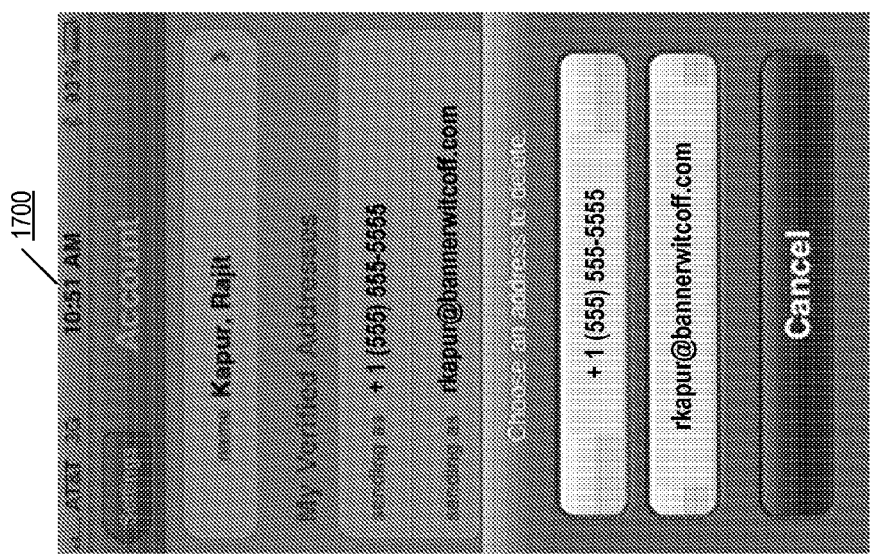

According to one or more aspects, user interface 1400 further may include one or more controls that may allow a user to add one or more registered identities, such as an add email address control 1404 and an add mobile number control 1405, as well as a control that may allow a user to delete registered identities, such as a delete address control 1406. The addition of one or more registered identities is further described below with respect to the subsequent steps of the method illustrated in FIG. 5. Where a user selects delete address control 1406, the user computing device and/or software application executed thereon may, for instance, display a user interface allowing the user to select an address to delete. An example of a user interface screen 1700 that may be displayed to allow a user to select an address to delete is illustrated in FIG. 17.

Referring again to FIG. 5, in step 502, user input corresponding to a request to register an identity may be received. For example, in step 502, the user computing device may receive user input, via a user interface, corresponding to a request to register a new identity with the communication service. In one or more arrangements, this user input may be received as a selection of the add email address control 1404 or the add mobile number control 1405 of user interface 1400.

Figure 16:
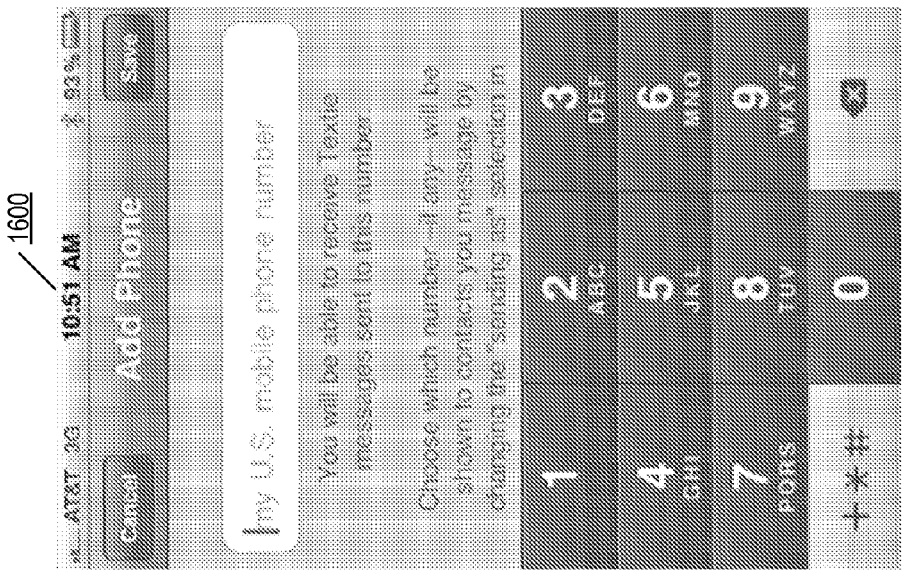
Figure 15:
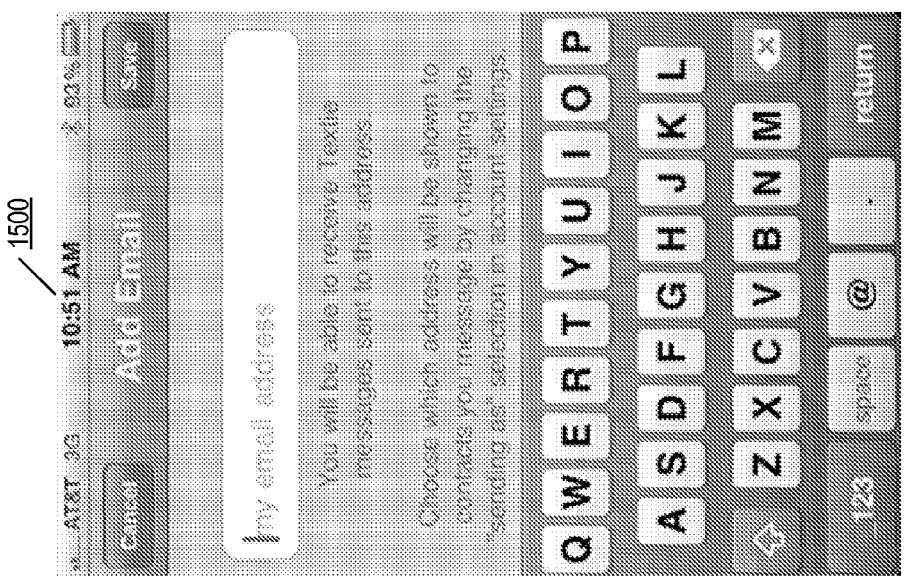

In step 503, a user interface may be displayed that allows a user to add an identity. For example, in step 503, the user computing device may display a user interface via which the user may provide input to facilitate the addition and/or registration of a new identity. An example of a user interface screen 1500 that may be displayed (e.g., by the user computing device and/or by the software application) to enable a user to add an email identity is illustrated in FIG. 15. Additionally, an example of a user interface screen 1600 that may be displayed (e.g., by the user computing device and/or by the software application) to enable a user to add a phone identity is illustrated in FIG. 16.

In step 504, user input specifying identity information may be received. For example, in step 504, the user computing device may receive user input via one or more of the user interfaces displayed in step 503, and this user input may specify information about the identity to be added (e.g., an email address if the identity to be added is an email identity, a phone number if the identity to be added is a phone or SMS identity, a social networking username if the identity to be added is a social networking identity, etc.).

In step 505, identity information may be transmitted to a registration server. For example, in step 505, the user computing device may transmit the identity information received in step 504 to one or more servers that handle identity registration for the communication service (e.g., the communication service provided by the software application executed by the computing device). In one or more arrangements, the message server described above with respect to FIG. 4 may function as the registration server and perform the steps involved in registering identities, as described below.

In step 506, the registration server may send a verification message to the identity to be registered. The verification message may be sent, for instance, so as to confirm that the user registering the identity with the communication service has access to the normal communications endpoint of the identity to be registered (e.g., so as to prevent people from fraudulently registering identities, such as email address and phone numbers, that are not actually their own). In one or more arrangements, the verification message may include a hyperlink that a recipient must click on to send a verification confirmation back to the registration server. Additionally or alternatively, the verification message may prompt the recipient to reply with a certain message (e.g., "Yes") to confirm verification. In one or more additional arrangements, the verification message may include a verification code or key that the user must enter into an application (e.g., the communications software application being executed by the computing device 100), and which the application may subsequently crosscheck with the registration server to determine whether the entered code or key matches the verification code or key sent in the verification message.

In step 507, it may be determined whether the identity has been verified. For example, the registration server may determine whether a verification confirmation has been received (e.g., because the recipient of the verification message clicked on the link included in the verification message) and/or whether a confirmatory reply has been received (e.g., because the recipient of the verification message replied in the particular way that the verification message indicated the user should reply to confirm verification, because the recipient of the verification message provided the registration server with a verification code or key matching a corresponding verification code or key sent in the verification message, etc.).

If it is determined, in step 507, that the identity has not been verified, then the registration server may continue to wait for a verification response and/or a confirmatory reply, and/or the method may end. On the other hand, if it is determined, in step 507, that the identity has been verified, then in step 508, the registration server may store updated user information in one or more databases. For example, in step 508, the registration server may store information in one or more databases indicating that the particular identity has been registered as being associated with the user. Additionally or alternatively, if it is determined, in step 507, that the identity has been verified, then in step 508, the registration server may send a message to the user computing device and/or a software application executed thereon indicating that verification was successful and/or causing a user interface to be displayed to the user to notify the user that verification was successful. Subsequently, the method may end.

Figure 6A:
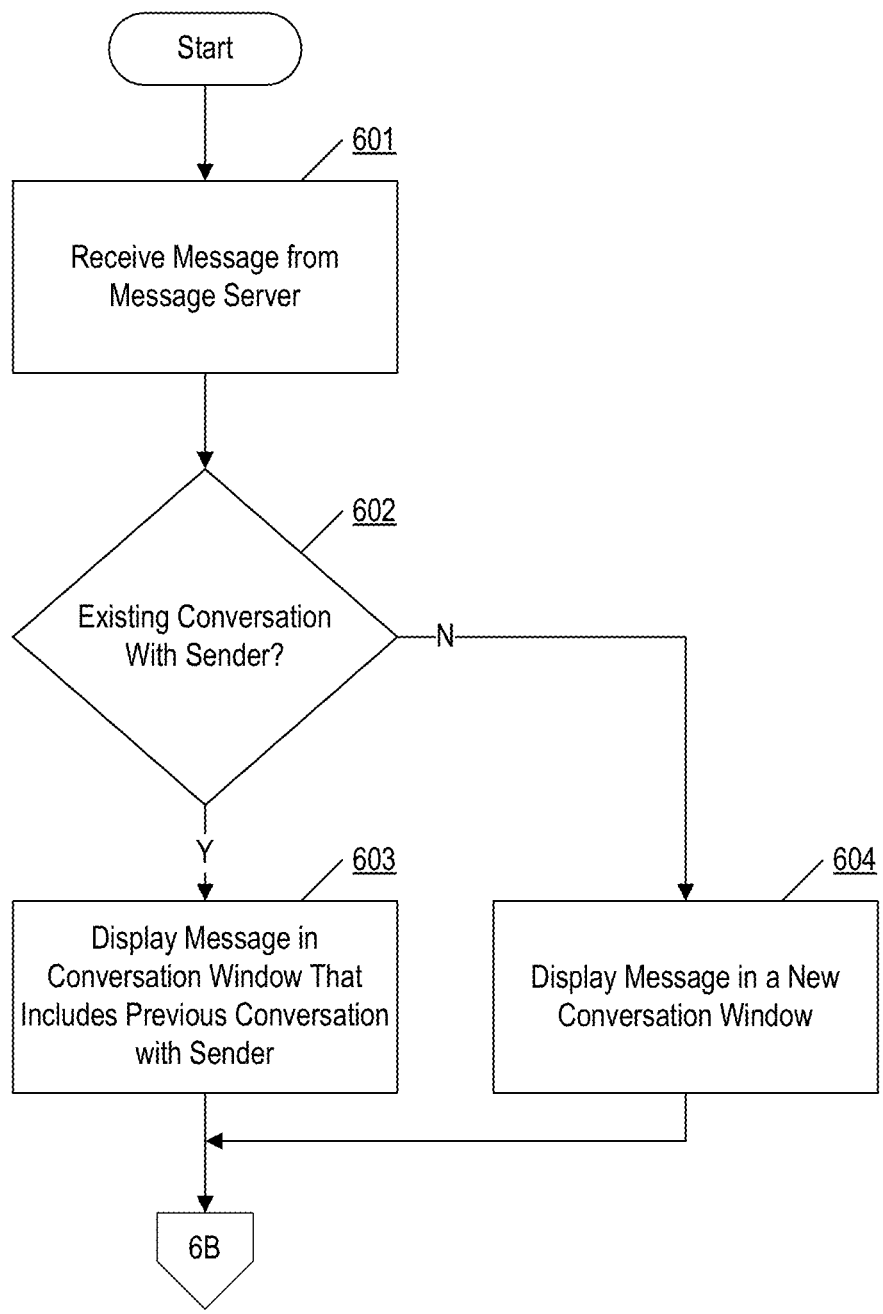
FIGS. 6A and 6B illustrate another example method of handling messages according to one or more illustrative aspects of the disclosure.
Figure 6B:
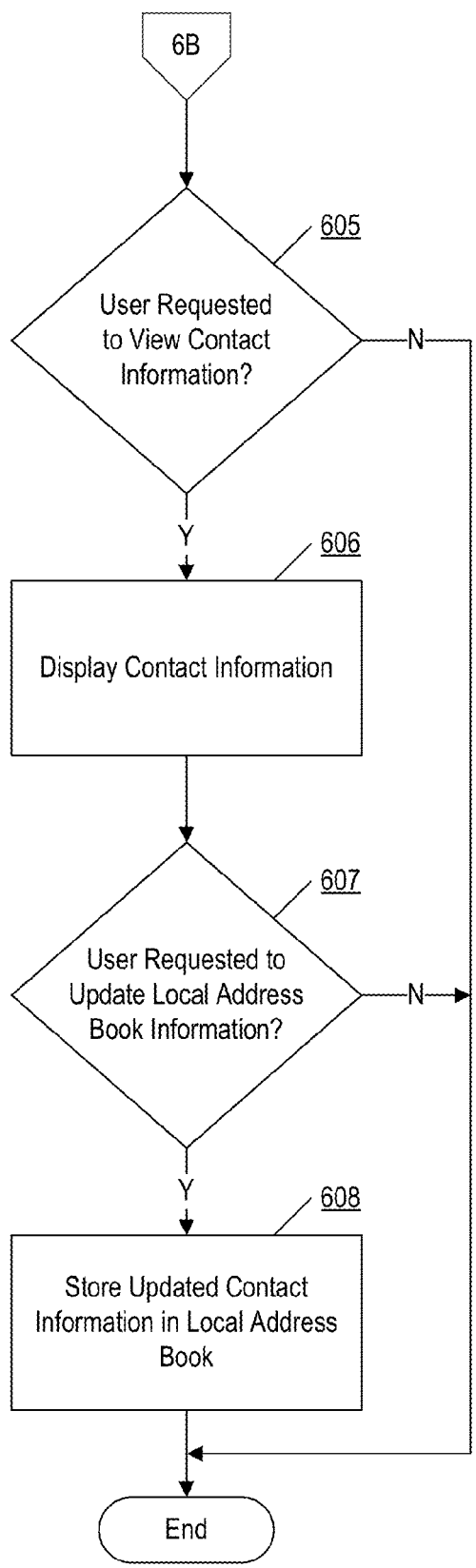

FIGS. 6A and 6B illustrate another example method of handling messages according to one or more illustrative aspects of the disclosure. In particular, the example method illustrated in FIGS. 6A and 6B shows how incoming messages may be aggregated into conversations based on the person, rather than the identity, sending such messages, and further illustrates how local address book data may be updated based on contact information that may be sent with such messages and/or registered with a communication service.

In step 601, a message may be received from a message server. For example, in step 601, a computing device (e.g., computing device 100) and/or a software application executed thereon may receive a new message from a message server associated with the communication service described above. In one or more arrangements, the message may be pushed to the computing device and/or the software application by the message server, as described above.

In some arrangements, the sender of the message may be registered with the communication service, and in such arrangements, the message may include contact information that the sender has registered with the communication service. For example, the message may include contact information associated with all of the identities that the sender has registered with the communication service, rather than just the particular one or more identities from which the message is originating. In other arrangements, the sender of the message might not be registered with the communication service, and in such arrangements, the message might not include such contact information. For example, the sender simply may be replying to a message which was previously sent by the user via the communication service provided by the message server, but which was received by the sender via a different communication service, such as email or SMS.

In step 602, it may be determined whether there is an existing conversation with the sender of the message. For example, in step 602, the computing device and/or the software application may determine whether a conversation window already exists for messages received from and/or sent to the sender of the message (e.g., by determining, based on local address book data, whether a particular conversation or message thread exists that includes messages sent to and/or received from one or more identities associated with the sender of the message).

In one or more arrangements, as local address book data is updated and/or modified, the computing device and/or the software application may update and/or re-sort the existing conversations, since, as described above, local address book data may affect conversation groupings to the extent that conversations are grouped by user (rather than by identity). Additionally or alternatively, when the computing device is initially powered on and/or when the software application is initially loaded, the computing device and/or software application may dynamically build the conversation threads by grouping messages into conversations, by user, based on the local address book data. As noted above, should the address book data change after this initial sorting, the messages may need to be re-grouped into conversations.

Additionally or alternatively, in determining whether a conversation window already exists for messages received from and/or sent to the sender of the message, the computing device may place the handle of the sender's identity in a canonical form to facilitate matching the sender's identity to records stored in the local address book data (which also may be stored in canonical form). In other arrangements, the computing device also may place the records stored in the local address book data in canonical form so as to facilitate such matching. For example, an email identity may be placed in canonical form by converting all characters in the handle of the identity into lowercase and/or by ignoring all characters in the handle following a plus (+) character. As an another example, a telephone number identity may be placed in canonical form by converting the telephone number into the international format for telephone numbers (e.g., +1 555 123 4567).

If it is determined, in step 602, that a conversation window already exists from messages received from and/or sent to the sender of the message, then in step 603, the message may be displayed in a conversation window that includes the previous conversation with the sender (e.g., the previous messages received from and/or sent to the sender of the message). For example, in step 603, the computing device may display a user interface that includes such a conversation window, similar to the user interfaces described above that include conversation windows. Subsequently, the method may proceed to step 605, which is further described below.

Alternatively, if it is determined, in step 602, that a conversation window does not already exist for messages received from and/or sent to the sender of the message, then in step 604, the message may be displayed in a new conversation window. For example, in step 604, the computing device may display a user interface that includes a new conversation window, similar to the user interfaces described above that include new conversation windows.

In step 605, it may be determined whether the user requested to view contact information associated with the sender of the message. For example, in step 605, the computing device may determine whether user input has been received corresponding to a request to view such contact information. In at least one arrangement, such user input may be received as selection of a control in a user interface.

Figure 18:
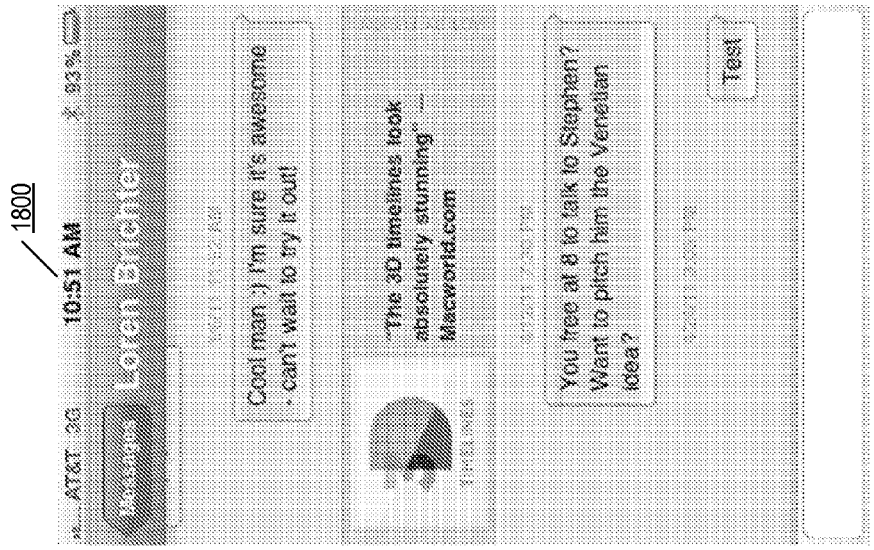

For example, FIG. 18 illustrates an example user interface screen 1800 that includes a conversation window and may be displayed by the computing device and/or by the software application. If a user were to scroll to the top of the conversation window displayed in the user interface, one or more controls may be revealed and/or displayed. For instance, FIG. 19 illustrates an example user interface screen 1900 in which a conversation window has been scrolled up and controls 1901, 1902, and 1903 have been revealed and/or displayed. In one or more arrangements, contact info control 1901 may allow a user to view more contact information about the other participant in the conversation. Call control 1902 may allow the user to place a telephone call to the other participant in the conversation. Older messages control 1903 may allow the user to view older messages sent to and/or received from the other participant in the conversation. If, for instance, a user were to select contact info control 1901, this selection may be received by the computing device as user input corresponding to a request to view contact information.

If it is determined, in step 605, that a request to view contact information has not been received, then the method may end. Alternatively, if it is determined, in step 605, that a request to view contact information has been received, then in step 606, contact information associated with the sender of the message may be displayed. For example, in step 606, the computing device may display a user interface that includes contact information associated with the sender of the message. In situations where the sender of the message is registered with the communication service, the contact information displayed in step 606 may include all of the contact information registered with the communication service (e.g., the various identities that the sender has registered with the communication service, even if the particular message is not sent from all of such identities). In some arrangements, where the sender of the message is registered with the communication service, the contact information displayed in step 606 may include only the contact information that the user has registered with the communication service and opted to share with others (e.g., the contact information might only include the identities that the user is "sending as," as may be specified by the user via one or more of the user interfaces described above). In other situations where the sender of the message is not registered with the communication service, the contact information displayed in step 606 may include all known contact information about the sender (which might, for instance, only be the identity from which the message was sent). Additionally or alternatively, whether or not the sender is registered with the communication service, any local address book data associated with the sender may also be displayed. An example of a user interface screen 2000 that includes contact information and that may be displayed (e.g., by the computing device and/or by the software application) is illustrated in FIG. 20.

In step 607, it may be determined whether the user requested to update local address book information. For example, in step 607, it may be determined whether user input has been received corresponding to a request to update local address book information based on registered contact information associated with the sender and/or based on contact information included with the message. Such user input may, for instance, be received as a selection of a control included in a user interface.

If it is determined, in step 607, that a request to update local address book information has not been received, then the method may end. Alternatively, if it is determined, in step 607, that a request to update local address book information has been received, then in step 608, updated contact information may be stored in a local address book. For example, in step 608, the computing device may update, in the local address book, contact information associated with the sender of the message that was registered with the communication service and/or included in the message. In some instances, this may include storing information about new identities not previously included in the local address book data and/or overwriting information about other identities that were previously included in the local address book data but have since been modified. Subsequently, the method may end.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, the steps illustrated in the illustrative figures may be performed in other than the recited order, and one or more steps illustrated may be optional in accordance with aspects of the disclosure. Additionally or alternatively, one or more steps may be combined, split into multiple steps, and/or be used in different methods altogether.

What is claimed is:

1. A method, comprising:
   registering, by a computing device, an identity for use with a first communication service, the identity being used when communicating via a second communication service different from the first communication service;
   sending, by the computing device, a first message to a first identity;
   sending, by the computing device, a second message to a second identity; and
   in response to determining, based on local address book data, that the first identity and the second identity are both associated with a first person, displaying, by the computing device, the first message and the second message in a single conversation window,
   wherein the first communication service is a messaging service provided at least in part by a software application executed by the computing device, the messaging service facilitating transmission of messages in accordance with one or more protocols,
   wherein the identity registered for use with the first communication service includes a handle and a denotation of the second communication service on which the handle is used to communicate,
   wherein the identity registered for use with the first communication service is at least one of a telephone number associated with a Short Message Service (SMS) communication service different from the messaging service, an email address associated with an email communication service different from the messaging service, and a username associated with a social networking service different from the messaging service, and
   wherein the messaging service is further provided at least in part by at least one message server that is configured to store registration information and process messages associated with the first communication service, the at least one message server being further configured to cause, when processing at least one message to be sent to a recipient identity that is not registered with the first communication service, a connection to be established to a communication service associated with the recipient identity.

2. The method of claim 1, further comprising:
   receiving, by the computing device, a third message; and
   in response to determining, based on the local address book data, that the third message is from the first person, displaying the third message in the single conversation window.

3. The method of claim 1, wherein the first identity is a telephone number.

4. The method of claim 1, wherein the first identity is an email address.

5. The method of claim 1, wherein the first identity is a username associated with a social networking service.

6. The method of claim 1,
   wherein the first message is sent via the first communication service when the first identity is registered with the first communication service, and
   wherein the second message is sent via the second communication service when the second identity is not registered with the first communication service.

7. The method of claim 1, further comprising:
   receiving, by the computing device, user input specifying two or more identities associated with a user to be used in sending new messages, the two or more identities being registered for use with the first communication service; and
   in response to receiving a command to send a new message, sending, by the computing device, via the first communication service, the new message as originating from the user associated with the two or more specified identities.

8. The method of claim 7, wherein a second person receiving the new message is able to update local address book data based on information registered with the first communication service about the two or more identities.

9. The method of claim 1, further comprising:
in response to determining, based on the local address book data, that the first identity and the second identity are not both associated with a first person,
displaying, by the computing device, the first message in a first conversation window; and
displaying, by the computing device, the second message in a second conversation window different from the first conversation window.

10. The method of claim 1, further comprising:
in response to determining, based on the local address book data, that the first identity and the second identity are not both associated with a first person, and in response to determining that the first message and the second message include the same content, displaying the first message and the second message in a group conversation window.

11. A method, comprising:
registering, by a computing device, an identity for use with a first communication service, the identity being used when communicating via a second communication service different from the first communication service;
receiving, by the computing device, via the first communication service, a first message from a first identity;
receiving, by the computing device, a second message from a second identity; and
in response to determining, based on local address book data, that the first identity and the second identity are both associated with a first person, displaying, by the computing device, the first message and the second message in a single conversation window,
wherein the first communication service is a messaging service provided at least in part by a software application executed by the computing device, the messaging service facilitating transmission of messages in accordance with one or more protocols,
wherein the identity registered for use with the first communication service includes a handle and a denotation of the second communication service on which the handle is used to communicate,
wherein the identity registered for use with the first communication service is at least one of a telephone number associated with a Short Message Service (SMS) communication service different from the messaging service, an email address associated with an email communication service different from the messaging service, and a username associated with a social networking service different from the messaging service, and
wherein the messaging service is further provided at least in part by at least one message server that is configured to store registration information and process messages associated with the first communication service, the at least one message server being further configured to cause, when processing at least one message to be sent to a recipient identity that is not registered with the first communication service, a connection to be established to a communication service associated with the recipient identity.

12. The method of claim 11, further comprising:
prior to receiving the first message, sending, by the computing device, a third message to the first person via the first communication service,
wherein at least one of the first message and the second message are sent by the first person as a reply to the third message, and
wherein the first person is not registered with the first communication service.

13. The method of claim 11, wherein the first identity is a telephone number that has been registered with the first communication service.

14. The method of claim 11, wherein the first identity is an email address that has been registered with the first communication service.

15. The method of claim 11, wherein the first identity is a username associated with a social networking service that has been registered with the first communication service.

16. The method of claim 11,
wherein the second message is received via the second communication service.

17. The method of claim 16, further comprising:
updating, by the computing device, the local address book based on information about the first person included in the first message.

18. The method of claim 17, wherein the information about the first person was previously registered with the first communication service.

19. The method of claim 17, wherein the information about the first person was attached to the first message by at least one computing device that processes messages associated with the first communication service.

20. The method of claim 11, further comprising:
receiving, by the computing device, a third message, the third message having been sent as from two or more identities associated with the first person.

21. The method of claim 20, wherein at least one of the two or more identities is a third identity different from the first identity and the second identity.

22. The method of claim 21, further comprising:
in response to receiving the third message, determining, by the computing device, that a second conversation is also associated with the first person, the second conversation being previously displayed in a second conversation window different from the single conversation window; and
updating, by the computing device, the single conversation window to include one or more messages from the second conversation.

23. At least one non-transitory computer-readable medium having computer-executable instructions stored thereon that, when executed, cause at least one computing device to:
register an identity for use with a first communication service, the identity being used when communicating via a second communication service different from the first communication service;
receive a first request to send a first message to a first identity;
in response to determining that the first identity is registered with the first communication service, determine to send the first message via the first communication service;
send the first message to the first identity;
receive a second request to send a second message to a second identity;
in response to determining that the second identity is not registered with the first communication service, determine to send the second message via the second communication service;
send the second message to the second identity; and
in response to determining, based on local address book data, that the first identity and the second identity are both associated with a first person, display the first message and the second message in a single conversation window, wherein the first communication service is a messaging service provided at least in part by a software application executed by the at least one computing device, the messaging service facilitating transmission of messages in accordance with one or more protocols, wherein the identity registered for use with the first communication service includes a handle and a denotation of the second communication service on which the handle is used to communicate, wherein the identity registered for use with the first communication service is at least one of a telephone number associated with a Short Message Service (SMS) communication service different from the messaging service, an email address associated with an email communication service different from the messaging service, and a username associated with a social networking service different from the messaging service, and wherein the messaging service is further provided at least in part by at least one message server that is configured to store registration information and process messages associated with the first communication service, the at least one message server being further configured to cause, when processing at least one message to be sent to a recipient identity that is not registered with the first communication service, a connection to be established to a communication service associated with the recipient identity.

* * * * *